United States Patent [19]

Potter et al.

[11] Patent Number: 5,497,484

[45] Date of Patent: Mar. 5, 1996

[54] FILE MENU SUPPORT FOR ENCAPSULATED APPLICATIONS

[75] Inventors: Cathy Potter, Los Altos; Brian Harrison, Scotts Valley; Charles Whelan, Placerville, all of Calif.

[73] Assignee: Hewlett-Packard Company, Palo Alto, Calif.

[21] Appl. No.: 21,933

[22] Filed: Feb. 24, 1993

[51] Int. Cl.$^6$ .............................. G06F 17/30; G06F 3/03
[52] U.S. Cl. .................... 395/600; 364/DIG. 1; 395/156; 395/157; 395/159; 395/650; 395/728
[58] Field of Search ........................ 395/155–161, 395/600; 345/119, 120

[56] References Cited

U.S. PATENT DOCUMENTS

| | | | |
|---|---|---|---|
| 5,185,885 | 2/1993 | Dysert et al. ........................ | 395/600 |
| 5,226,117 | 7/1993 | Miklos ................................. | 395/157 |
| 5,252,951 | 10/1993 | Tannenbaum et al. ............. | 345/156 |
| 5,261,042 | 11/1993 | Brandt ................................. | 395/156 |
| 5,287,447 | 2/1994 | Miller et al. ........................ | 395/157 |
| 5,287,504 | 2/1994 | Carpenter et al. ................. | 395/600 |
| 5,317,687 | 3/1994 | Torres ................................. | 395/159 |
| 5,339,423 | 8/1994 | Beitel et al. ........................ | 395/600 |
| 5,345,550 | 9/1994 | Bloomfield ......................... | 395/156 |
| 5,355,497 | 10/1994 | Cohen-Levy ....................... | 395/700 |
| 5,386,564 | 1/1995 | Shearer et al. ..................... | 395/650 |

Primary Examiner—Thomas G. Black
Assistant Examiner—Hosain T. Alam

[57] ABSTRACT

When an operating system for the computing system opens, creates or renames a file, a new full path name of the file is added to a history queue. When the operating system sends a message to an application process indicating a new window title, the history queue is searched, starting with a most recent entry, for a matching full path name which includes the new window title. When the matching full path name which includes the new window title is found within the history queue, an icon which is attached to the matching full name path is displayed on the computer screen. When the operating system sends a message to the application process indicating the application process is to be closed, the history queue is flushed. When the operating system sends a message to the application process indicating the application process is to be destroyed, the history queue is searched for a full path name which includes an extension for the application process. When the history queue has a full path name which includes an extension for the application process, an icon which is attached to the matching full name path is displayed on the computer screen.

13 Claims, 16 Drawing Sheets

FILE MENU SUPPORT FOR ENCAPSULATED APPLICATIONS

BACKGROUND

The present invention concerns file menu support for encapsulated programs. The present invention is an improvement of technology disclosed within U.S. patent application No. 07/292,610, filed on Dec. 30, 1988 by William M. Crow, et al., abandoned, continuation filed U.S. patent application No. 08/336,718 on Nov. 11, 1994, the subject matter of which is herein incorporated by reference.

One problem that has made computer use difficult is inefficient file management systems. For instance, there is often data incompatibility between data files which are originated by different computer applications. Typically, each computer application operates independently from other computer applications. It is extremely rare that data from one computer application may be effectively incorporated into data from another application. If data is incorporated, it is difficult if not impossible to modify. Furthermore, once data has been transferred from a first application to a second application, it is usually impossible to return the data back to the first application to be modified.

Once an environment has been presented which allows the effective transfer of data between applications, there remains the problem of upward compatibility for applications which were not originally designed to function in the environment.

One solution is the NewWave Desktop manager which provides a file management system which is currently used in conjunction with Microsoft Windows operating system. The NewWave Desktop manager is available from Hewlett Packard Co., having a business address of 3000 Hanover Street, Palo Alto, Calif. 94304. Microsoft Windows operating system is an operating system available from Microsoft Corporation, having a business address at 16011 NE 36th Way, Redmond, Wash. 98073-9717.

In previous versions of the NewWave Desktop manager, icons representing newly created data files have generally not been displayed on Desktop window until after the application is closed. In addition, in order to bring a multiple document interface (MDI) child window to the front of a display, only standard application-internal mechanisms have been available. These include, for example, clicking on the MDI child window (which would have to be visible), pulling down the application's "Window" menu and selecting the child window, or tabbing to the child window via CTRL F6.

In an encapsulation shell for Lotus Freelance, a special encapsulation shell was written which allowed an MDI child window to be brought to the front of a display by clicking on an icon for the MDI child window. This was accomplished by the object file management system making a direct call to a Windows operating system routine for the child. However, for other applications, such an implementation results in an application crash.

SUMMARY OF THE INVENTION

In accordance with the preferred embodiment of the present invention, a method is presented for use in a file management system within a computing system. When an operating system for the computing system opens, creates or renames a file, a new full path name of the file is added to a history queue. This is done, for example, by intercepting interrupts issued by the operating system to determine when files are being opened, created or renamed. For example, the history queue stores at most eight full path names for files which were most recently opened, created or renamed. When the operating system sends a message to an application process indicating a new window title, the history queue is searched, starting with a most recent entry, for a matching full path name which includes the new window title. When the matching full path name which includes the new window title is found within the history queue, an icon which is attached to the matching full name path is displayed on the computer screen.

In the preferred embodiment of the present invention, when the operating system sends a message to the application process indicating the application process is to be closed, the history queue is flushed. When the operating system sends a message to the application process indicating the application process is to be destroyed, the history queue is searched for a full path name which includes an extension for the application process. When the history queue has a full path name which includes an extension for the application process, an icon which is attached to the matching full name path is displayed on the computer screen.

The preferred embodiment of the present invention also includes a method for bringing a child window of a multiple document interface application process to the front of a computer screen. A dummy message is sent by the file management system to the multiple document interface application process in response to a mechanism activation. A dummy message is a message which is sent to an application but which is not intended to be processed by the application. The mechanism activation is, for example, the selection of an icon for the child window. This is accomplished, for example by placing a cursor over an icon for the child window and clicking a mouse button.

The dummy message sent in response to the mechanism activation identifies the child window to be brought to the front. An encapsulation shell intercepts messages to the multiple document interface application process. When the encapsulation shell intercepts the dummy message, the encapsulation shell calls a routine which brings the child window to the front of the computer screen. For example, the routine is the Microsoft Windows operating system routine "BringWindowToTop".

The preferred embodiment of the present invention enables the automatic and immediate attaching to a desktop of a file opened or saved from an application. The preferred embodiment of the present invention improves the file attaching capability over prior art systems in which file menu attaching was delayed. Also, the preferred embodiment of the present invention provides to a user a convenient external control mechanism for bringing forward MDI child window.

DESCRIPTION OF THE PREFERRED EMBODIMENT

Figure 1:
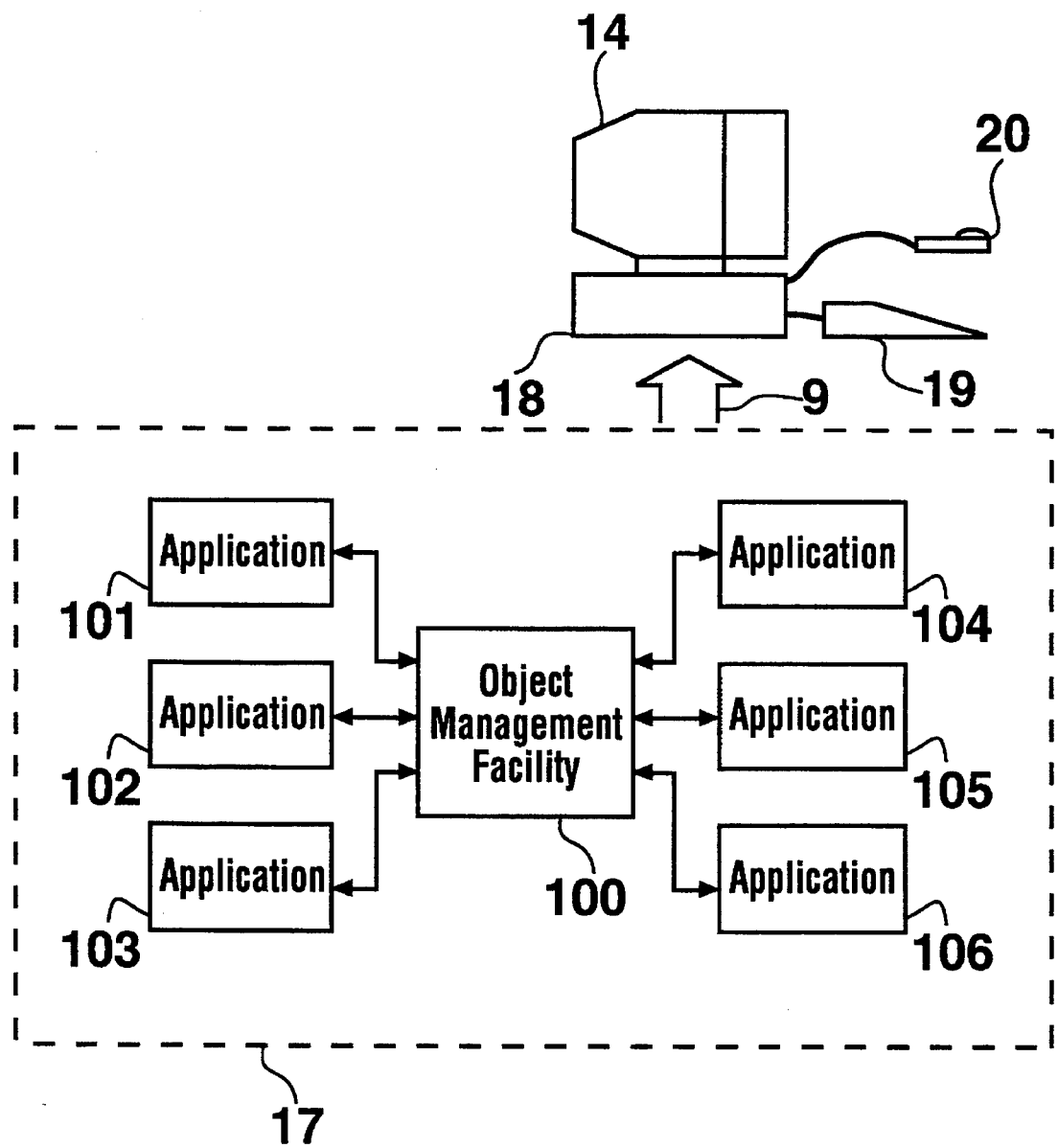
FIG. 1 is a block diagram of a computer in accordance with the preferred embodiment of the present invention.

FIG. 1 shows a computer 18 having a monitor 14, a keyboard 19 and a mouse 20. A portion of computer main memory 17 is shown by an arrow 9 to be within computer 18. Within computer memory main 17 is shown an object management facility (OMF) 100, an application 101, an application 102, an application 103, an application 104, an application 105 and an application 106.

Figure 2:
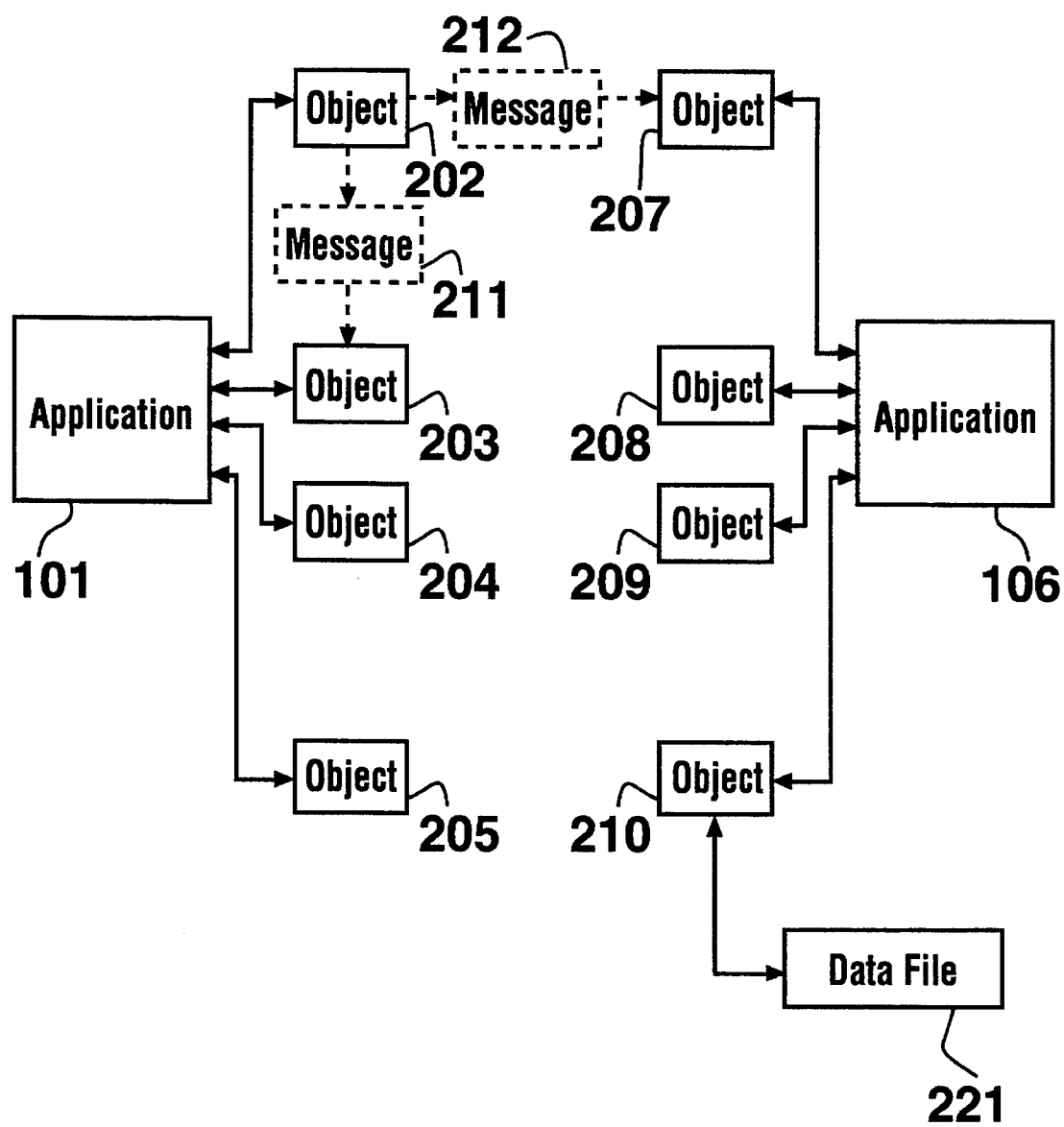
FIG. 2 and FIG. 3 show block diagrams which illustrate the relationship between objects, applications and data files in accordance with the preferred embodiment of the present invention.

Each of applications 101 to 106 store data using objects. For instance, in FIG. 2, application 101 is shown to have stored data using an object 202, an object 203, an object 204 and an object 205. Similarly, application 106 is shown to have stored data in an object 207, an object 208, an object 209 and an object 210. OMF 100 stores information indicating which objects go with which application. Objects which are associated with a single application are considered to be objects of the same type, or the same class. For instance, object 202, 203, 204 and 205 are of the same class because each is associated with application 101. Similarly objects 207, 208, 209 and 210 are of the same class because each is associated with application 106. All objects of the same class use the same application. When an application is being run by computer 18, OMF 100 informs the application which object's data the application should access. That object is then considered to be active. An object is inactive when the application the object is associated with is not being run by computer 18, or when the application the object is associated with is being run, but is not being run with the data of that object.

Active objects can communicate with each other using messages. For example if two instances of application 101 are being run by computer 18, one with the data of object 202 and the other with the data of object 203, object 202 and object 203 are both active. Therefore object 202 may send a message 211 to object 203. Similarly, if computer 18 is running application 101 with the data of object 202, and is running application 106 with the data of object 207, object 202 and object 207 are both active. Therefore, object 202 may send a message 212 to object 207.

Messages, such as message 211 and 212 may be formatted to be sent and received by all types of objects. This allows for free communication between all active objects. This also allows new object types to be defined and added to the system without requiring that the existing object types be updated to use the new type.

Each object has associated with it a data file. For instance, object 210 is shown to have associated with it a data file 221. Data in data file 221 are in a format which can be interpreted by application 106.

Figure 3:
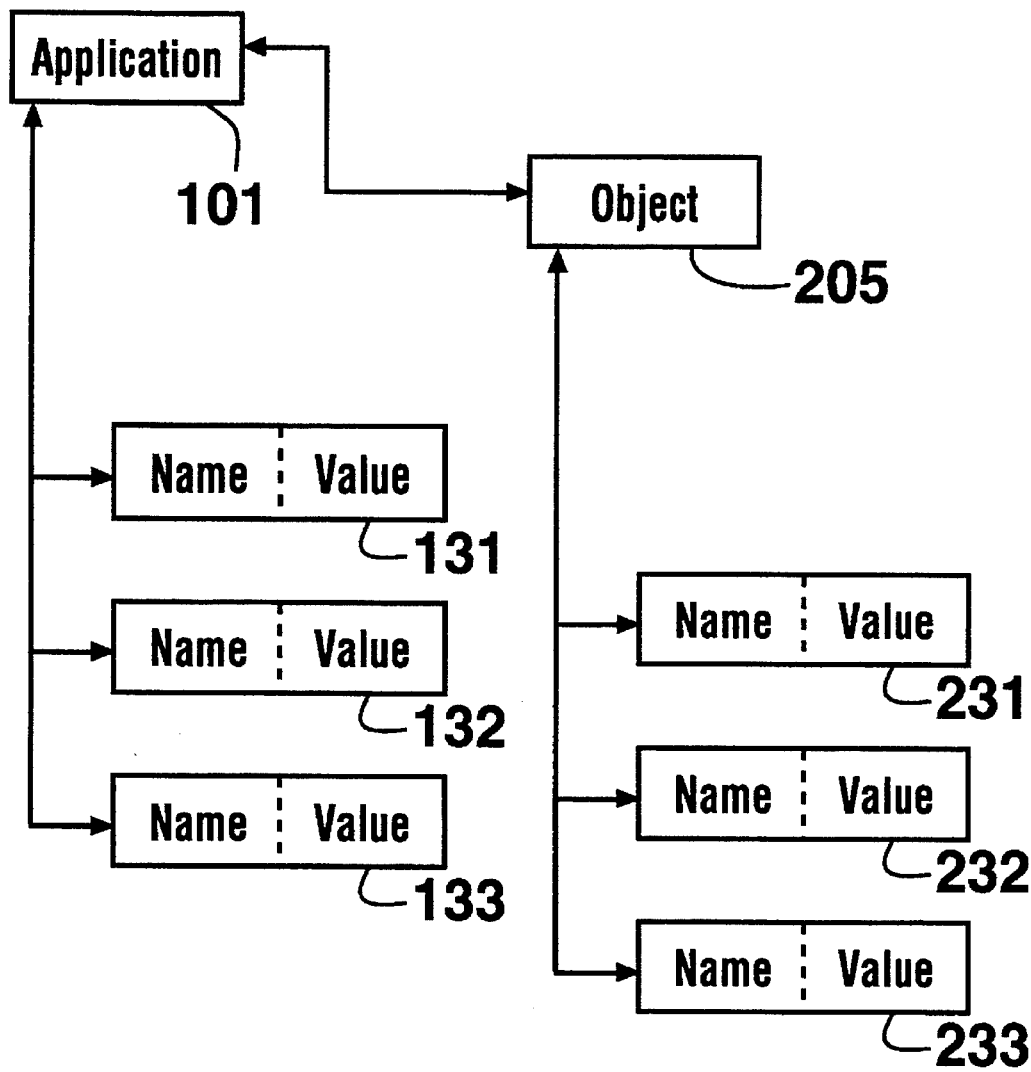

Each object has associated with it a list of properties. Each property has a name and a value which may be accessed by specifying the name. In addition, each class of objects has associated with it a list of properties that are common to all objects of that class. For instance, in FIG. 3, object 205 and application 101 are shown. Object 205 has associated with it a property 231, a property 232, and a property 233. Application 101 has associated with it a property 131, a property 132 and a property 133.

Property lists can contain any number of properties. Properties are used to store descriptive information about objects and classes, such as names, comments and so on.

Figure 4:
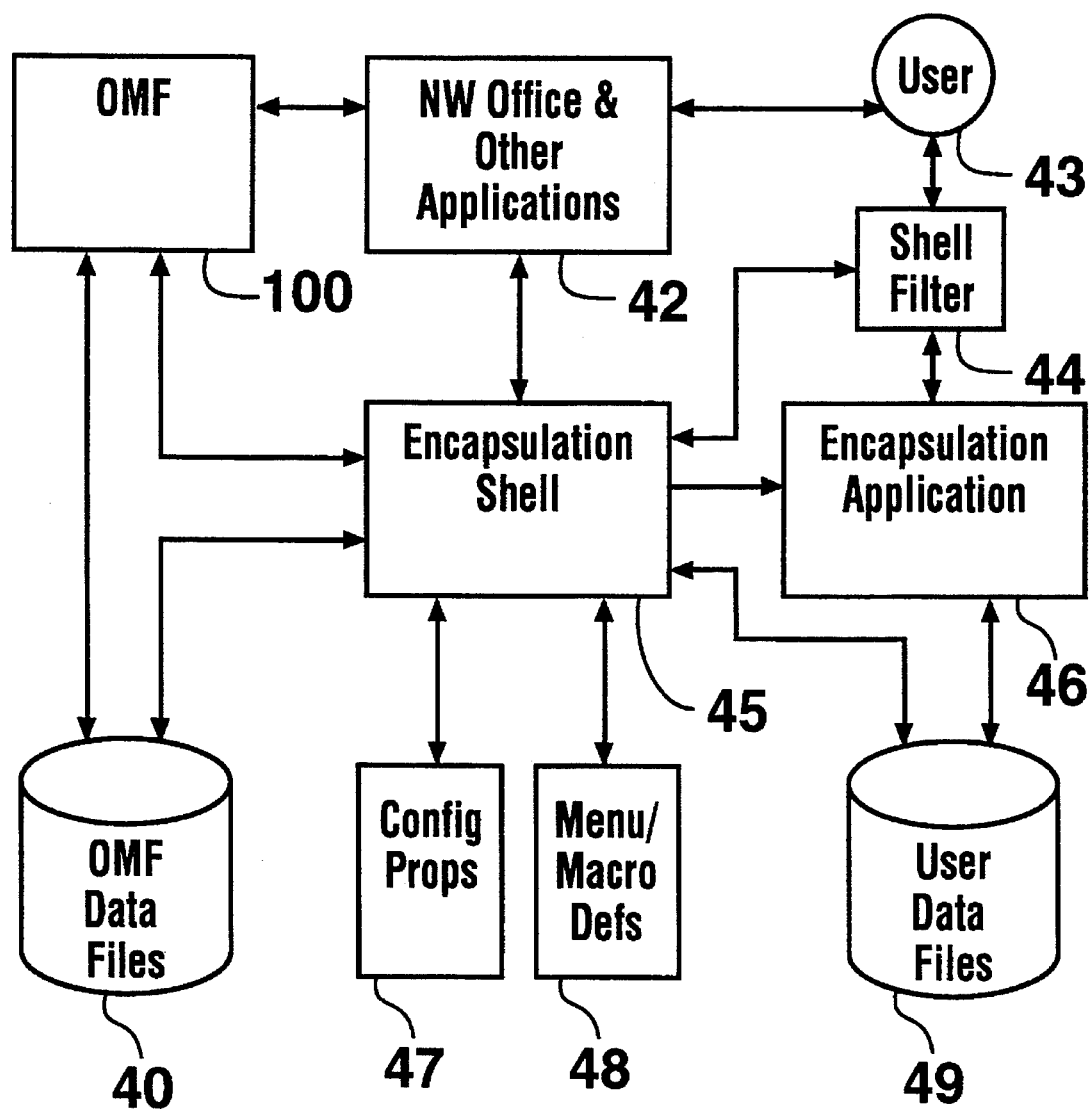
FIG. 4 is a block diagram which shows an encapsulated application in accordance with the preferred embodiment of the present invention.

A program not originally written for use with OMF 100 may be encapsulated and inherit many features of programs designed for use with OMF 100. FIG. 4 is a block diagram which shows how an application 46 may be encapsulated for use with OMF 100. Typical applications 42 written for the NewWave Desktop Manager environment are able to interact directly with a user 43 and with OMF 100. Data files for applications 42 are part of OMF data files 40. When any of applications 42 wish to access data files, they do so through OMF 100.

No modifications need be made to encapsulated application 46 in order to integrate it into the NewWave Desktop Manager environment. Encapsulated application 46 is allowed to continue to directly manipulate its own user data files 49. An encapsulation shell 45 serves as an interface between OMF 100 and encapsulated application 46. Encapsulated application does not know that encapsulation shell 45 exists, therefore encapsulated application 46 does not send data to encapsulation shell 45. However encapsulation shell 45 does interact with encapsulated application 46 and with user data files 49.

A shell filter 44 acts as a monitoring program between user 43 and encapsulated application 46. Most communication between user 43 and encapsulated application 46, shell filter 44 merely passes on. However, where appropriate, shell filter may intercept communication between user 43 and encapsulated application 46. Once the communication has been intercepted shell filter may, for example, pass the communication to encapsulation shell 45 for further processing.

Encapsulation shell 45 is written to generically handle a number of different types of applications. However, there is some information which encapsulation shell 45 needs to know about each encapsulated application. Therefore, each encapsulated application has associated with it configuration properties which encapsulation shell 45 accesses for information encapsulation shell needs to know about that encapsulated application. For encapsulated application 46, encapsulation shell 45 accesses information stored in configuration properties 47.

Further, using shell filter 44 and encapsulation shell 45 additional features may be added to an encapsulated application. Definitions for such added features particular to a specific application may be stored in a separate file accessed by encapsulation shell 45. For example, definitions for features specific to encapsulated application 46 are stored in a menu/macro definitions file 48.

In the preferred embodiment of the present invention, OMF 100 detects when a data file has become newly associated with an application main window (or for MDI applications, an MDI child window) because of a user File menu operation to "Open" or "Save As" the file. OMF 100 also determines the full path name of the data file. This information is used to facilitate the automatic attaching of the data file on a Desktop window.

For a new file (File menu Save As command), a new icon of the correct application type and corresponding to the new data file, appears on the Desktop window. The new icon is associated with the application window from which the Save As was done, and remains grayed (i.e., is colored gray) until the window is closed or re-associated with another file. Using mouse 20 to click on the grayed icon brings the associated application window to the top.

For a preexisting file which was opened using the File menu Open command, and which is already attached on the Desktop window, the icon grays and becomes associated with the application window.

The preferred embodiment of the present invention enables the automatic and immediate attaching to the Desktop window of a file opened or saved from an application. The file may be opened from or saved to any location on disc. The only restriction is that the file have the standard extension associated with the application (e.g. "WRI" for the MSWrite word processing application available from Microsoft Corporation).

The preferred embodiment of the present invention improves the file attaching capability over prior version in which files saved through the File menu were attached, i.e., in prior versions of NewWave Desktop Manager, files menu attaching was delayed. Only after the application was closed, and only if the files were saved in a special directory reserved for the application were new files attached to the Desktop window.

Figure 5:
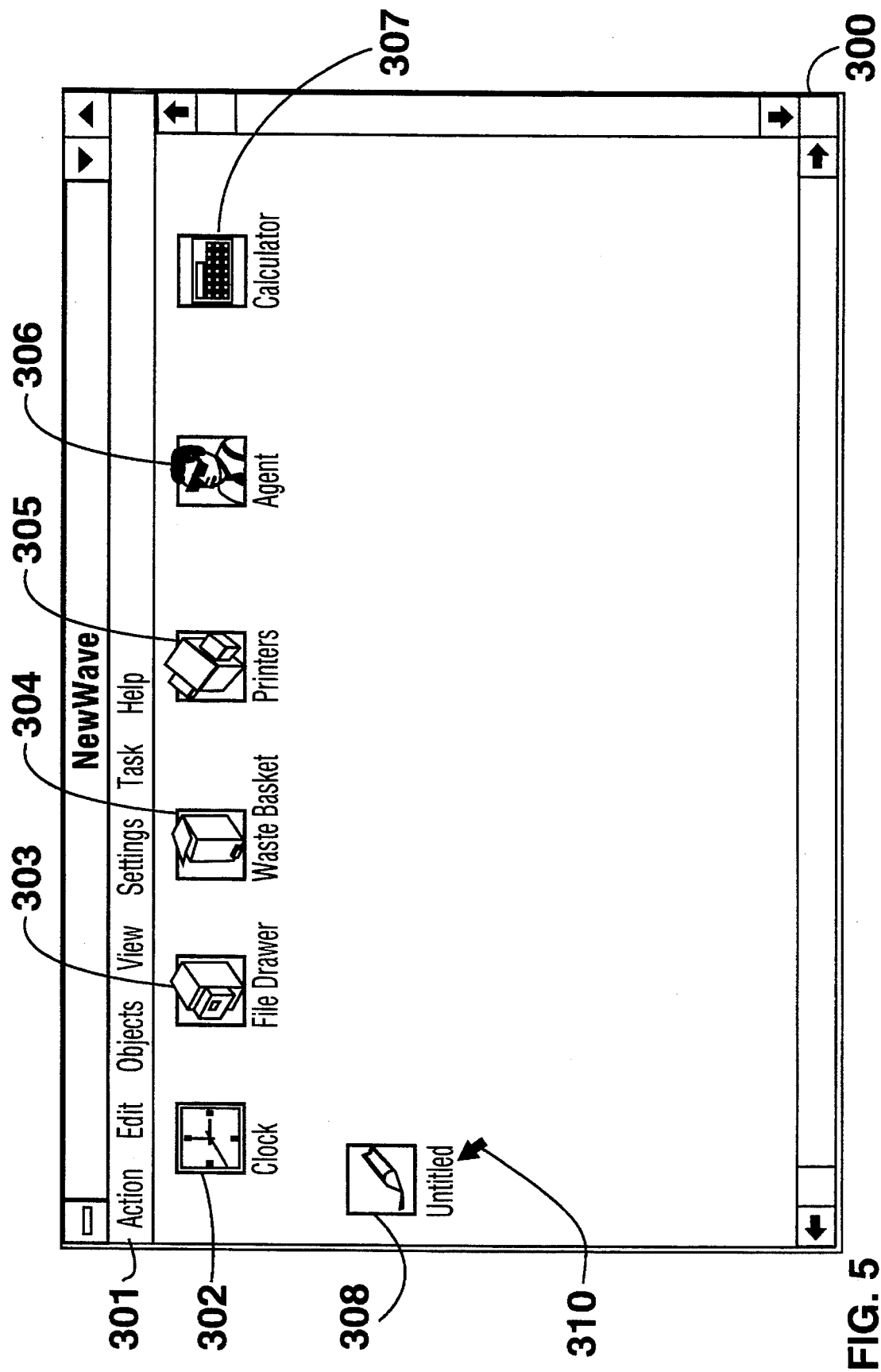
FIGS. 5, 6, 7, 8, 9 and 10 show the appearance on a computer screen of a session in which an icon for a new object is immediately placed on a Desktop window in accordance with the preferred embodiment of the present invention.

FIG. 5 shows a screen displayed on monitor 14. A Desktop window 300 has a menu bar 301. Desktop window 300 is also referred to as the "NewWave Desktop" or simply as the "Desktop". Within Desktop window 300, icons are displayed which each represent an object. For example, an icon 302, an icon 303, an icon 304, an icon 305, an icon 306, an icon 307 and an icon 308 are shown. Icons 302 through 307 represent NewWave Desktop Manager Tools.

Icon 308 represents an object "Untitled" associated with a word processing program. Object Untitled may be opened, for example, by using mouse 20 to place a cursor 310 over icon 308, and depressing a button on mouse 20 twice in quick succession.

Figure 6:
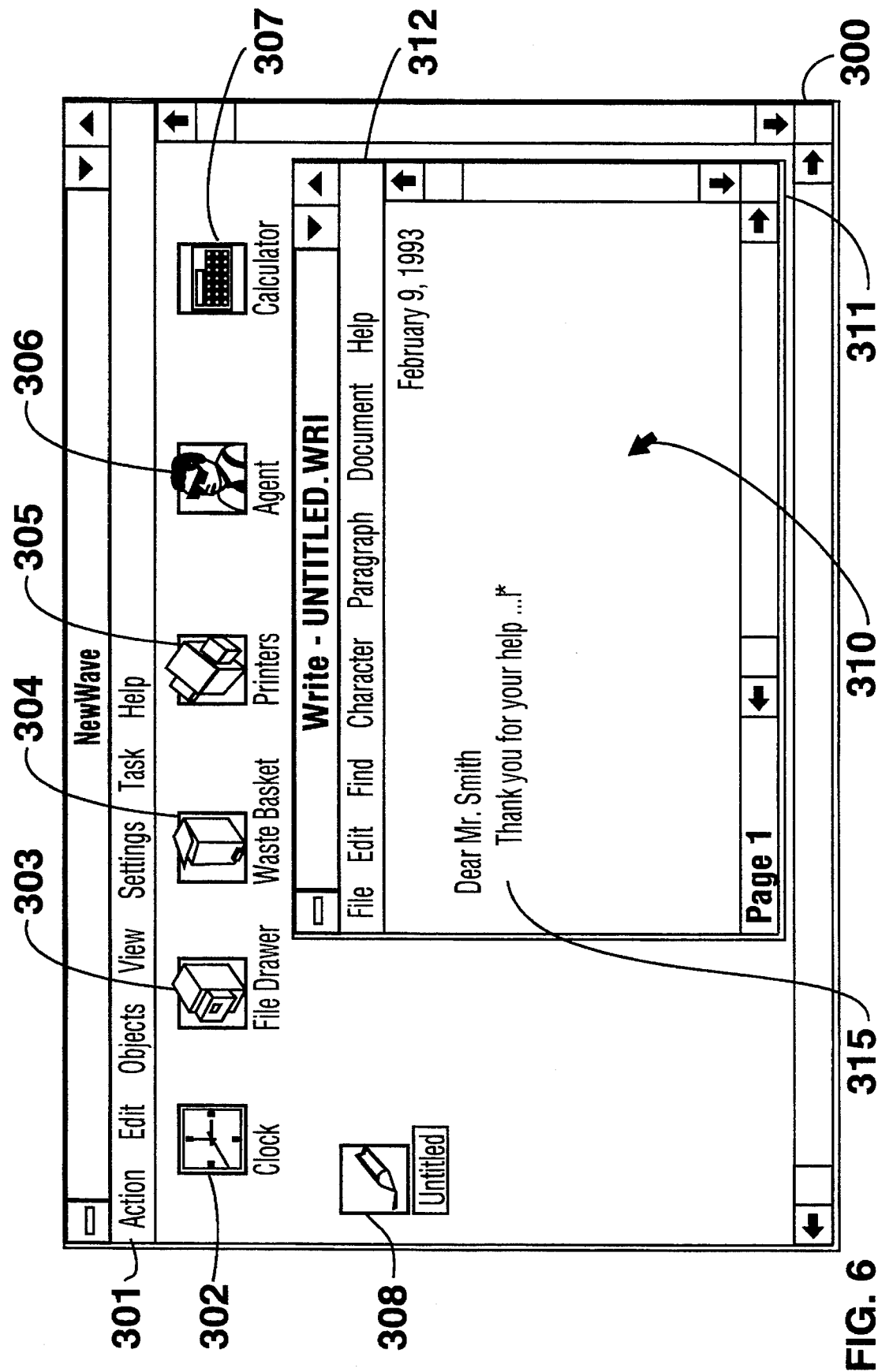
Figure 7:
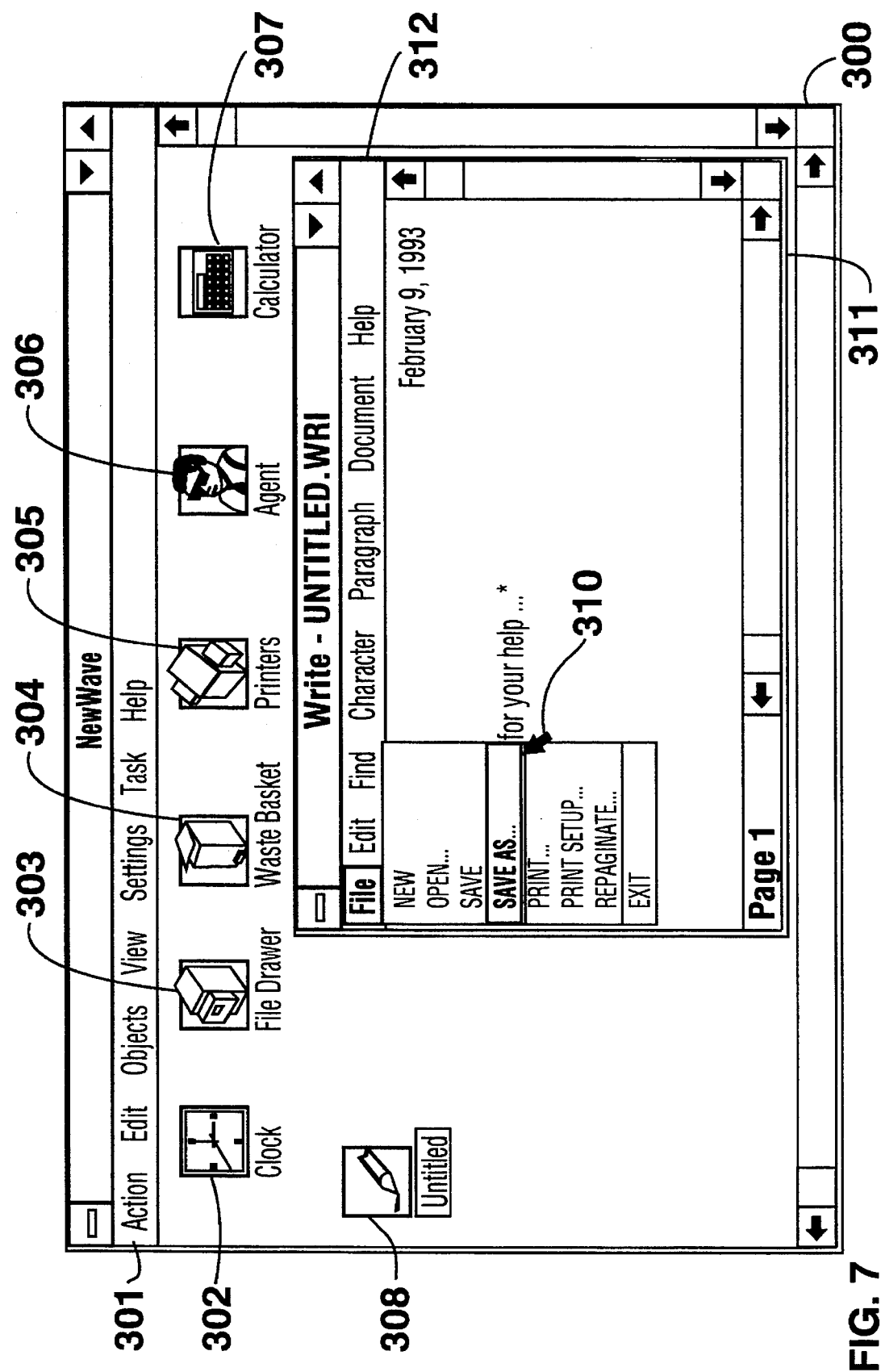
Figure 8:
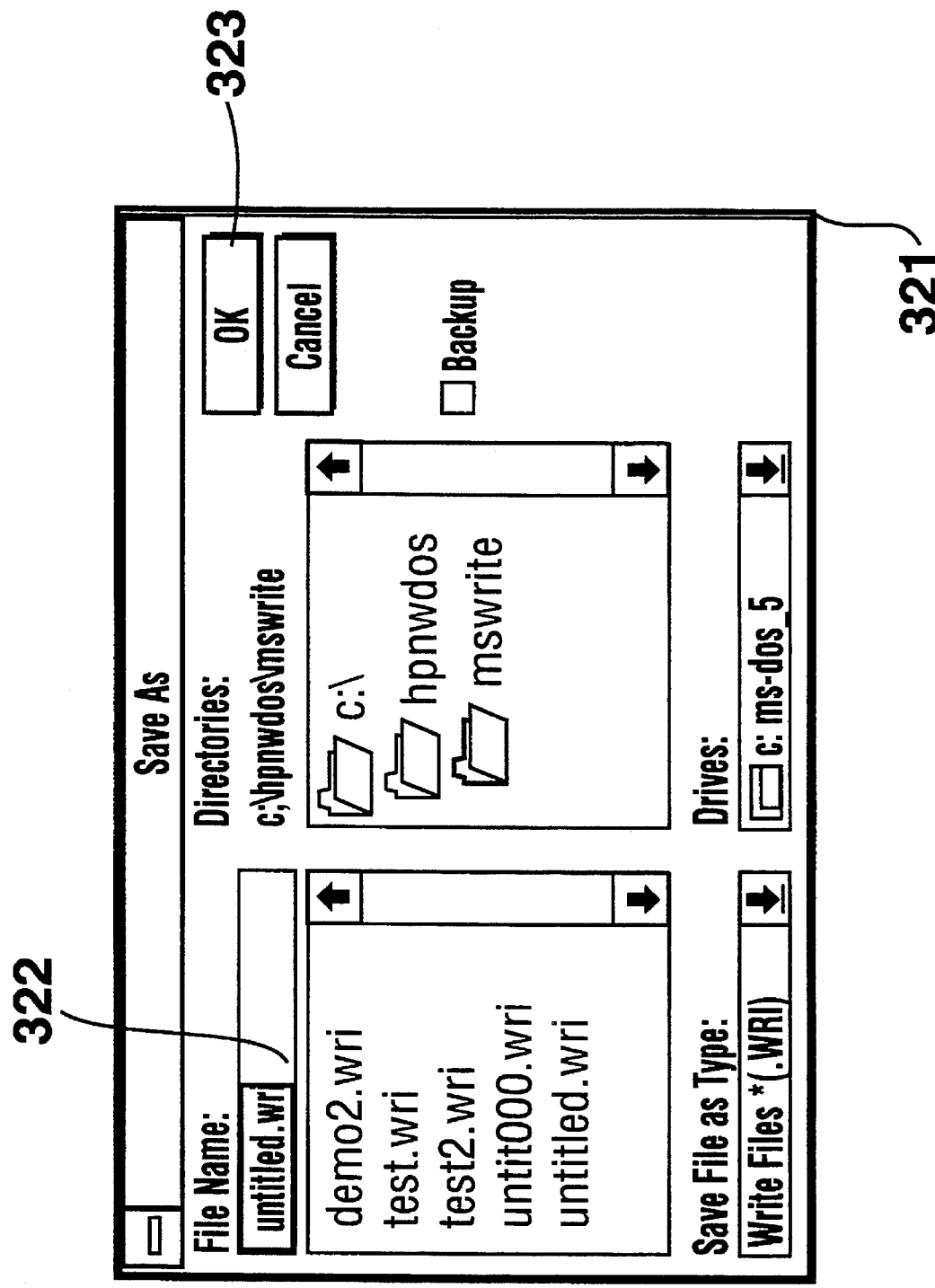
Figure 9:
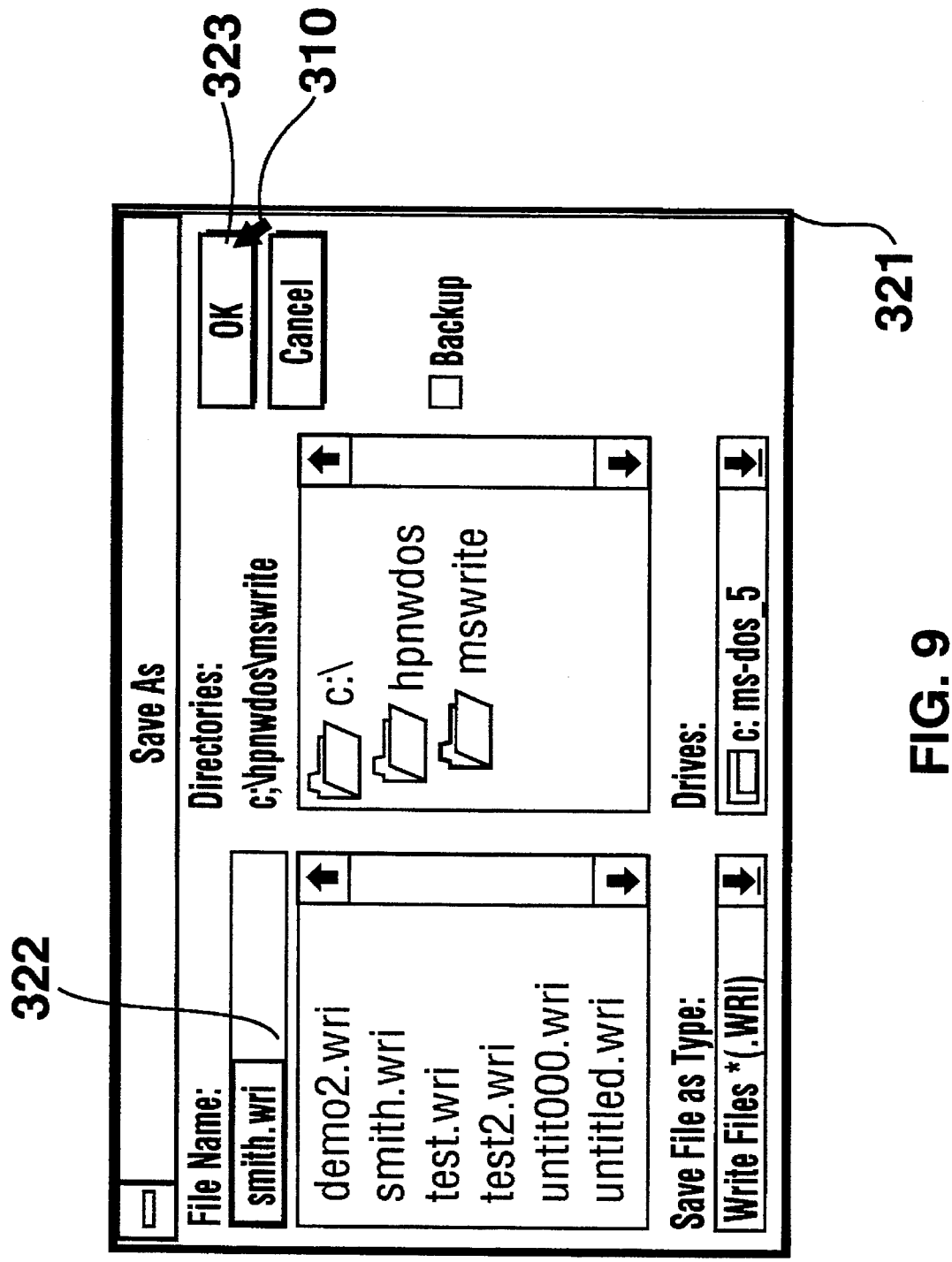
Figure 10:
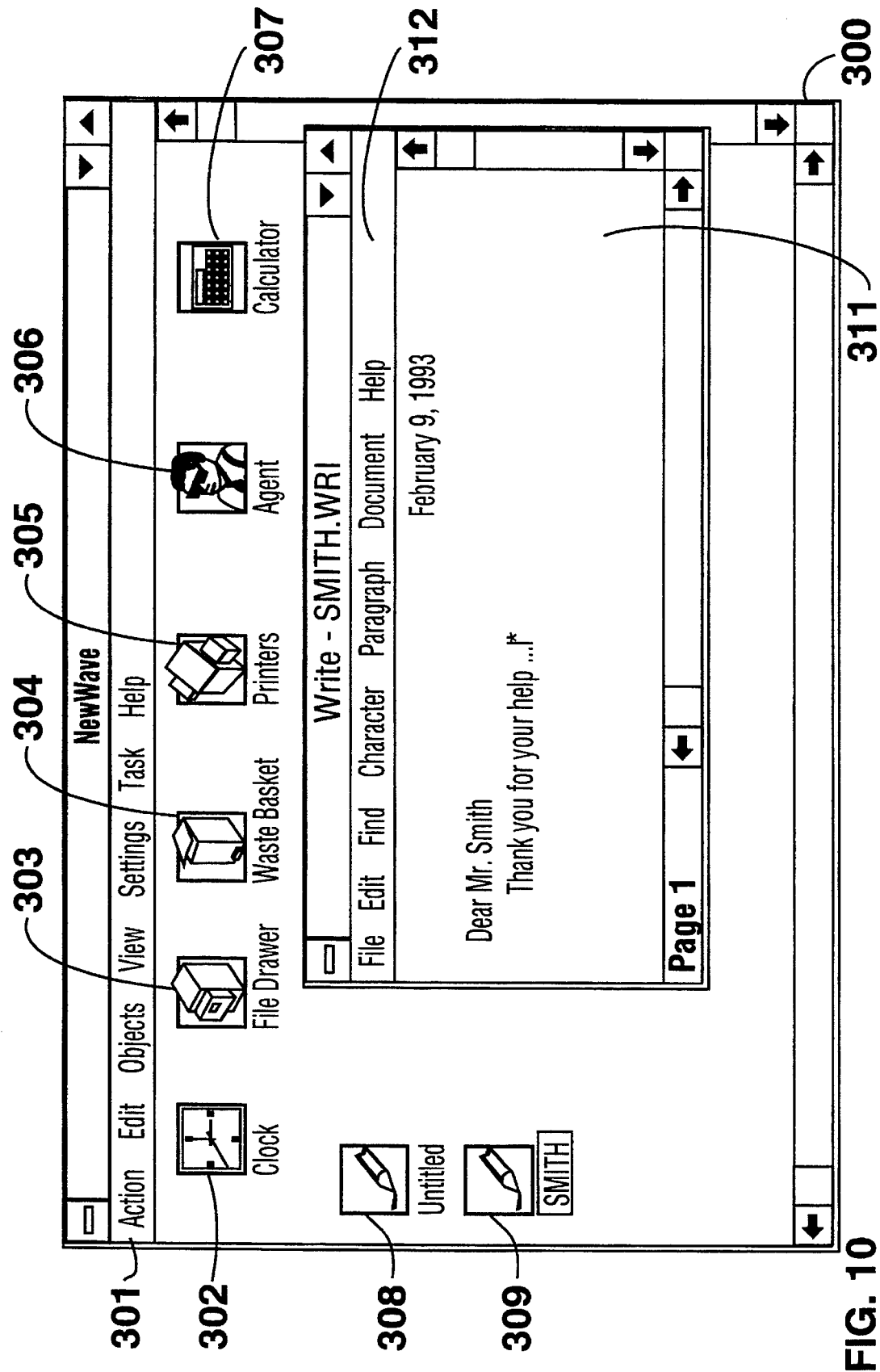

FIG. 6 shows an open window 311 for Object "Untitled". Window 11 includes a menu bar 312. Text 315 has been typed in by a user using keyboard 19. The user may save new data to disk storage, for example, by using cursor 310 and mouse 20 to select "Save As . . ." from pull-down menu "File" on menu bar 301, as shown by FIG. 7. FIG. 8 shows a "Save As" window 321. "Save As" window 321 includes a "File Name:" field 322. As shown by FIG. 8, a user can change the file name in "File Name:" using keyboard 19. Upon clicking an OK button 323, a new icon 309 appears on Desktop window 300, as shown in FIG. 10.

In order to automatically attach a file when a File menu Open or Save As operation occurs from an application, OMF 100 must know that a File menu operation has occurred, and what full path name of the file is. To detect that a File menu operation has occurred, encapsulation shell 45 subclasses the application window, and intercepts the Windows operating system "WM_SETTEXT" window-title change message. From the Windows operating system WM_SETTEXT "lParam" parameter, encapsulation shell 45 picks up the new title of the window, which contains the name of the newly associated file. Most Windows operating system applications follow the convention of displaying the current file being worked on in their window title.

Different Windows operating system applications display their file names with varying degrees of completeness. Some display the full path name, while others display only the file name or some ending portion of the path name which includes the file name. For these latter two cases, OMF 100 must determine the full path name. To do this, OMF 100 maintains a separate process which monitors file I/O activity in the system, and maintains a circular history queue of the full path names of the most recent eight files which were opened, created, or renamed (since some applications first save a dummy file and then rename it). Then when a changed partial file name is detected in an application window title, OMF 100 matches it against names in the queue to determine the complete path name.

The above mechanism works for most situations, however, there is a special case. Many applications do not generate a window title change when a file is saved when the user performs a "File" menu "New" command, has entered data, and has not saved the data to a file (no file is associated with the window) and when the user closes a window for the application and responds affirmatively when asked by the application if the user wants to save the data to a file. Since the window is closing, the application may not issue a window title change for this situation.

To handle the above-described case, OMF 100 attaches a file when OMF 100 encapsulation shell 45 detects a Windows operating system WM_DESTROY message occurring in an application window which has no file association and a saved or renamed file name with this application's associated extension appears in the file I/O history queue. This file in the file I/O history queue is assumed to be a file saved after a close and it is attached on Desktop window 300.

To minimize the possibility of incorrectly attaching a file which appears in the queue, OMF 100 flushes the file I/O history queue when the Windows operating system WM_CLOSE message is detected in an application window. This clears the queue out just before the application queries the user for the name of a file name in which to save the data. The Windows operating system WM_DESTROY message follows shortly after the user enters the name.

Figure 11:
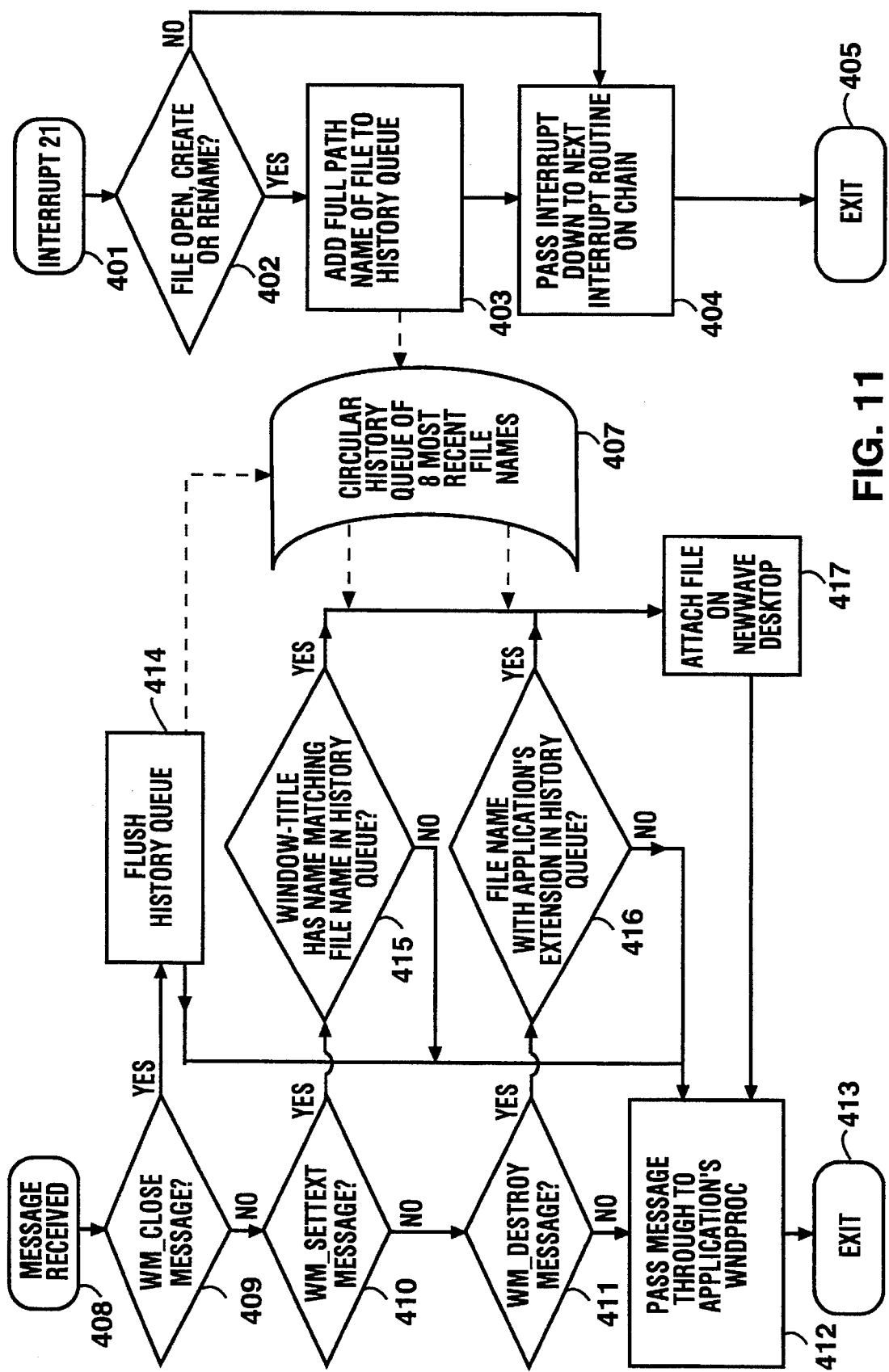
FIG. 11 is a flowchart which illustrates implementation of the immediate appearance of an icon for a new object on a Desktop window in accordance with the preferred embodiment of the present invention.

FIG. 11 is a flow chart which illustrates implementation of the preferred embodiment of the present invention. In a step 401, OMF detects an interrupt 21, generated by the DOS portion of the operating system which occurs for certain events including file I/O operations. In a step 402, OMF 100 determines whether the interrupt is caused by a file open, a file create or a file rename. If so, in a step 403, the full path name of the file is added to a history queue 407 of the eight most recent file names. An example of a full path name is: "c:\winword\my. doc". In the preferred embodiment of the present invention, there a single history queue for all the applications. In a step 404, the interrupt is passed down to a next interrupt routine on the interrupt chain. In a step 405, the interrupt routine is completed.

In a step 408, encapsulation shell 45 intercepts a message from Windows operating system. In a step 409, encapsulation shell 45 determines whether the message is a Windows operating system WM_CLOSE message. If so, in a step 414, encapsulation shell 45 flushes history queue 407 of all values.

In a step 410, encapsulation shell 45 determines whether the message is a Windows operating system WM_SET- TEXT message. If so, in a step 415, encapsulation shell 45 checks to see if the window-title name has a matching file name in history queue 407. An example of a window-title name is: "my.doc". If so, in a step 417, encapsulation shell 45 calls OMF 100 to attach the matching file to the Desktop window 300.

In a step 411, encapsulation shell 45 determines whether the message is a Windows operating system WM_DESTROY message. If so, in a step 416, encapsulation shell 45 checks to see if a file name with the application's extension exists in history queue 407. An example of an extension is: ".wri". If so, in step 417, OMF 100 attaches the matching file to the Desktop window 300.

After the intercepted message is processed, in a step 412, the message is passed through to the routine WndProc for encapsulated application 46.

In the preferred embodiment of the present invention, the immediate knowledge of File menu attached files allows agent tasks to reflect in the latest "FOCUS" statement the current file/object being worked on. Specifically, a "FOCUS" statement used in an agent task sets out the current file/object being worked on. When a "Save As" command occurs, a new object is both created and is the entity with the currently active window. When a new file is attached to the Desktop, an agent task is able FOCUS on a new object for the file, i.e., to identify the new object as being active.

Additionally, in the preferred embodiment of the present invention, an multiple document interface (MDI) child window in an application may be brought to the top via external programmatic control. In the preferred embodiment, the end user clicks on the child window's Desktop icon to bring the corresponding MDI child window to the top. The control mechanism is implemented through Windows operating system SDK calls, including subclassing of the application's window. Subclassing of the application's window includes aliasing an encapsulating shell as the application and intercepting messages to the application, then passing the appropriate messages on to the application. When the control mechanism is activated, the OMF 100 posts a dummy message to the application's main window. A dummy message is a message which is sent to an application but which is not intended to be processed by the application. Encapsulating shell, acting as the subclassing procedure of the program, intercepts the dummy message when it arrives. Reception of the message indicates that the application is in a non-busy state, and can change MDI child-window activation without confusion. The encapsulation shell 45 calls the routine BringWindowToTop on the desired MDI child window.

Figure 12:
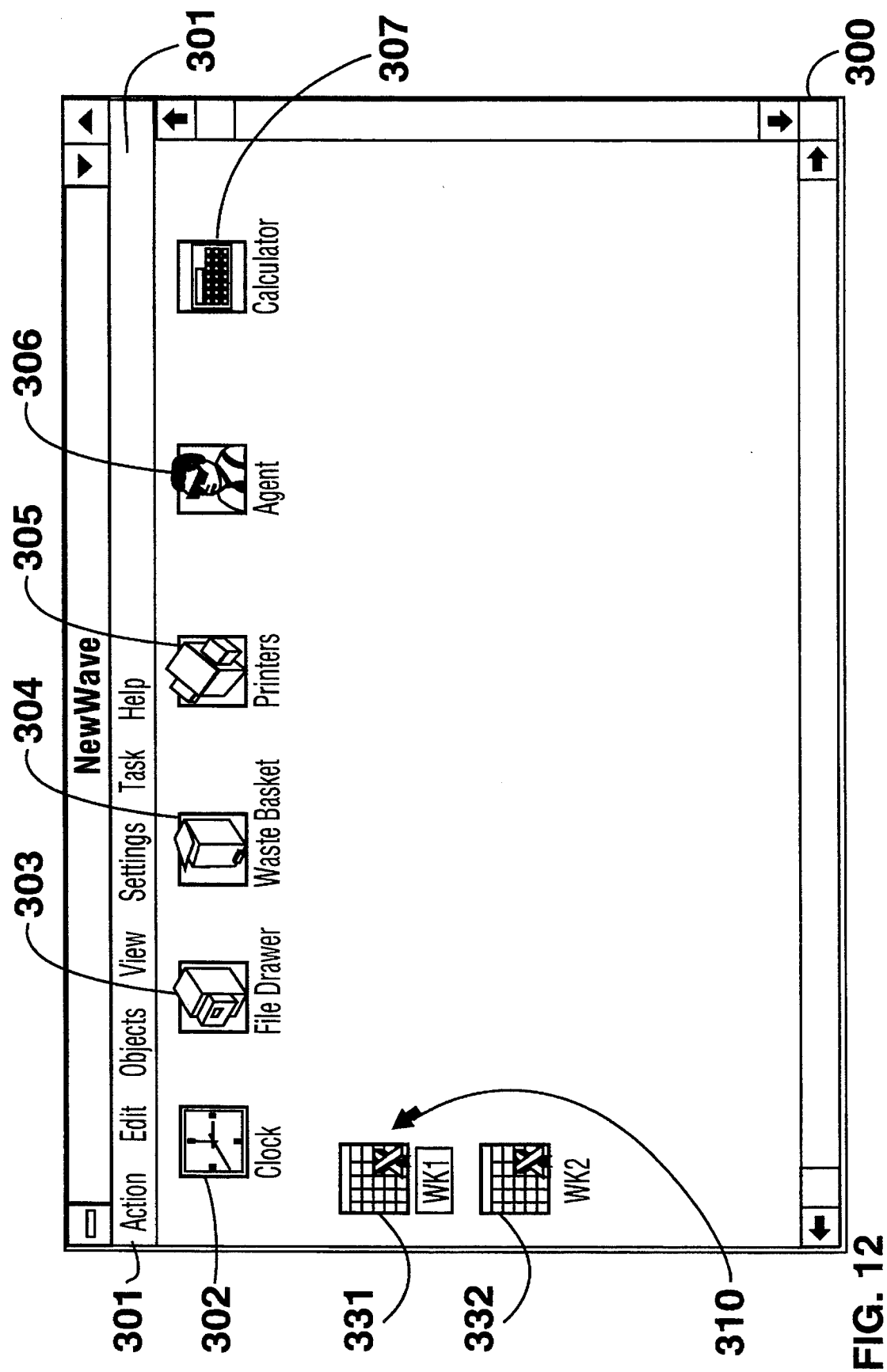
FIGS. 12, 13, 14 and 15 show the appearance on a computer screen of a session in which a user clicks an icon for MDI child window in order to bring the MDI child window to the front of a display in accordance with the preferred embodiment of the present invention.

For example, FIG. 12 shows an icon 331 for a first worksheet object of a spreadsheet program. In this example, the spreadsheet program is Microsoft Excel available from Microsoft Corporation. FIG. 12 also shows an icon 332 for a second worksheet object of a spreadsheet program. The first worksheet object may be opened, for example, by using mouse 20 to place cursor 310 over icon 3331, and depressing a button on mouse 20 twice in quick succession.

Figure 13:
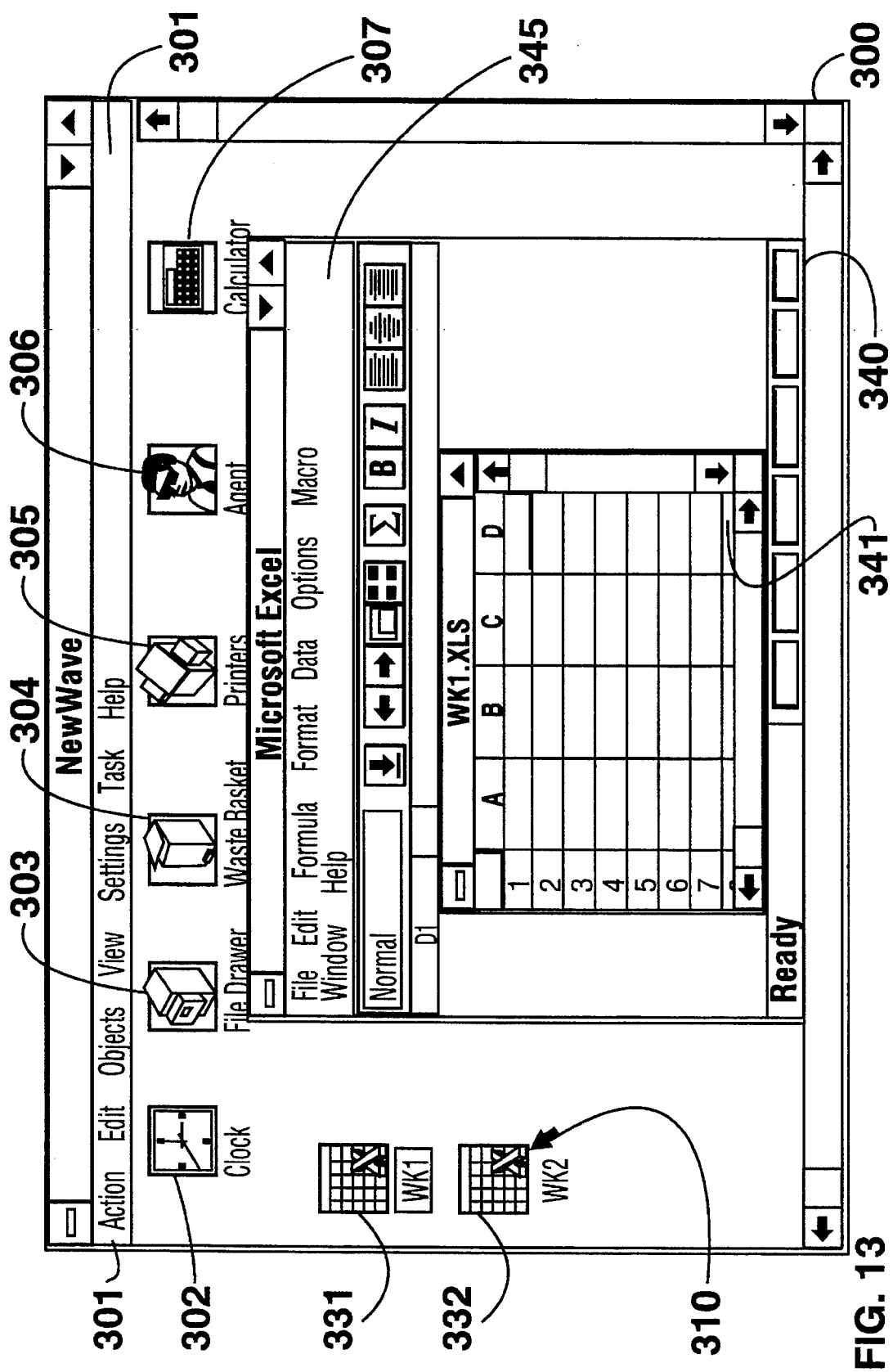

FIG. 13 shows an open window 340 for Microsoft Excel. Within window 340 is an MDI child window 341 for the first worksheet object. Icon 311 is altered to indicate that MDI child window 341 is open.

Figure 14:
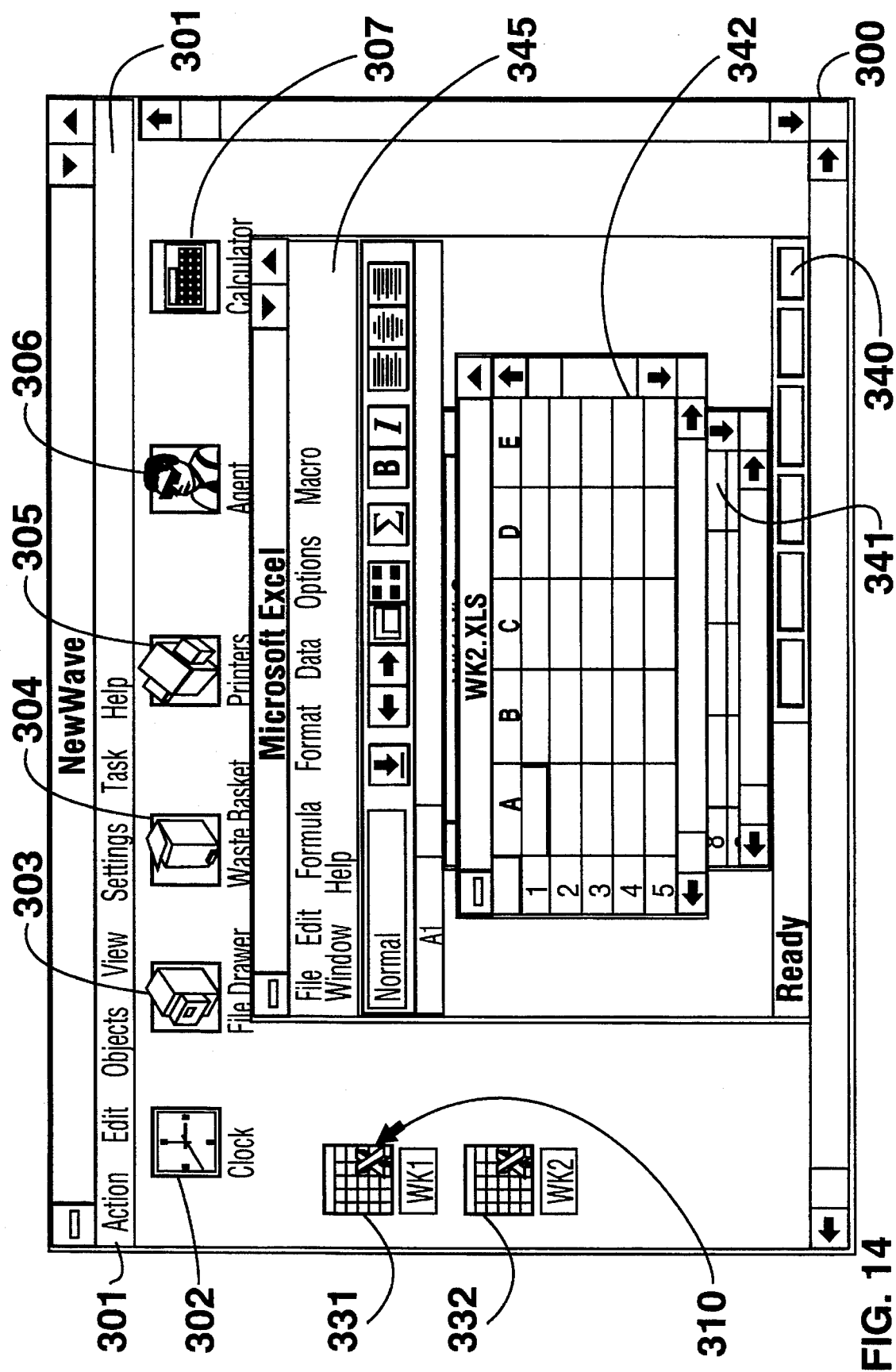

The second worksheet object may be opened, for example, by using mouse 20 and cursor 310 to invoke an "Open" command from pull-down menu "Action" on menu bar 345 of window 340. FIG. 14 shows, within window 340, an MDI child window 342 for the second worksheet object. Icon 312 is altered (e.g., grayed) to indicate that MDI child window 342 is open.

Figure 15:
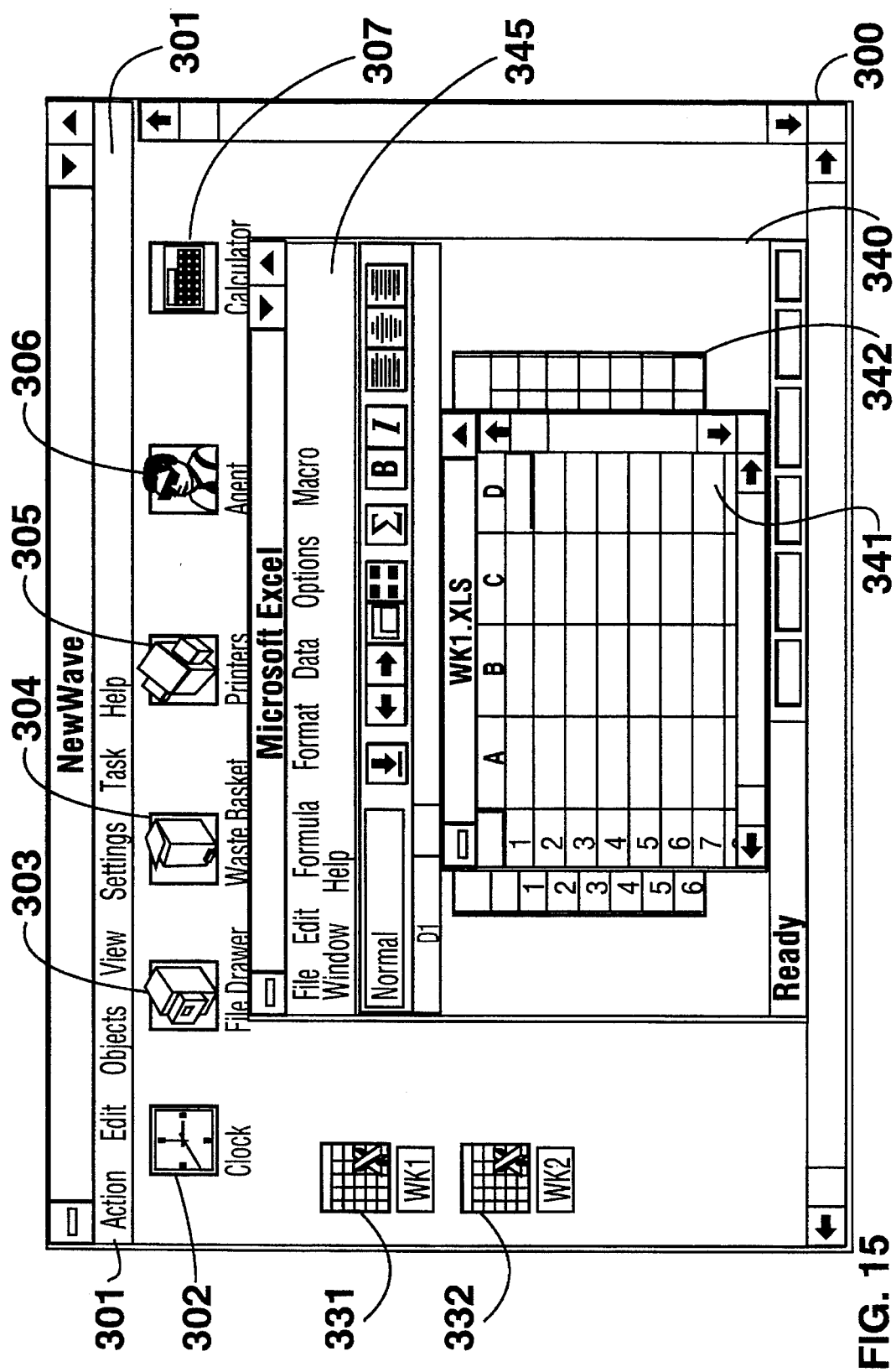

In FIG. 14, MDI child window 342 is shown in front of MDI child window 341. In order to bring MDI child window 341 to the front, cursor 310 is placed over icon 331 and a button on mouse 20 is clicked once. FIG. 15 shows the result: MDI child window 341 is now in front of MDI child window 342.

Figure 16:
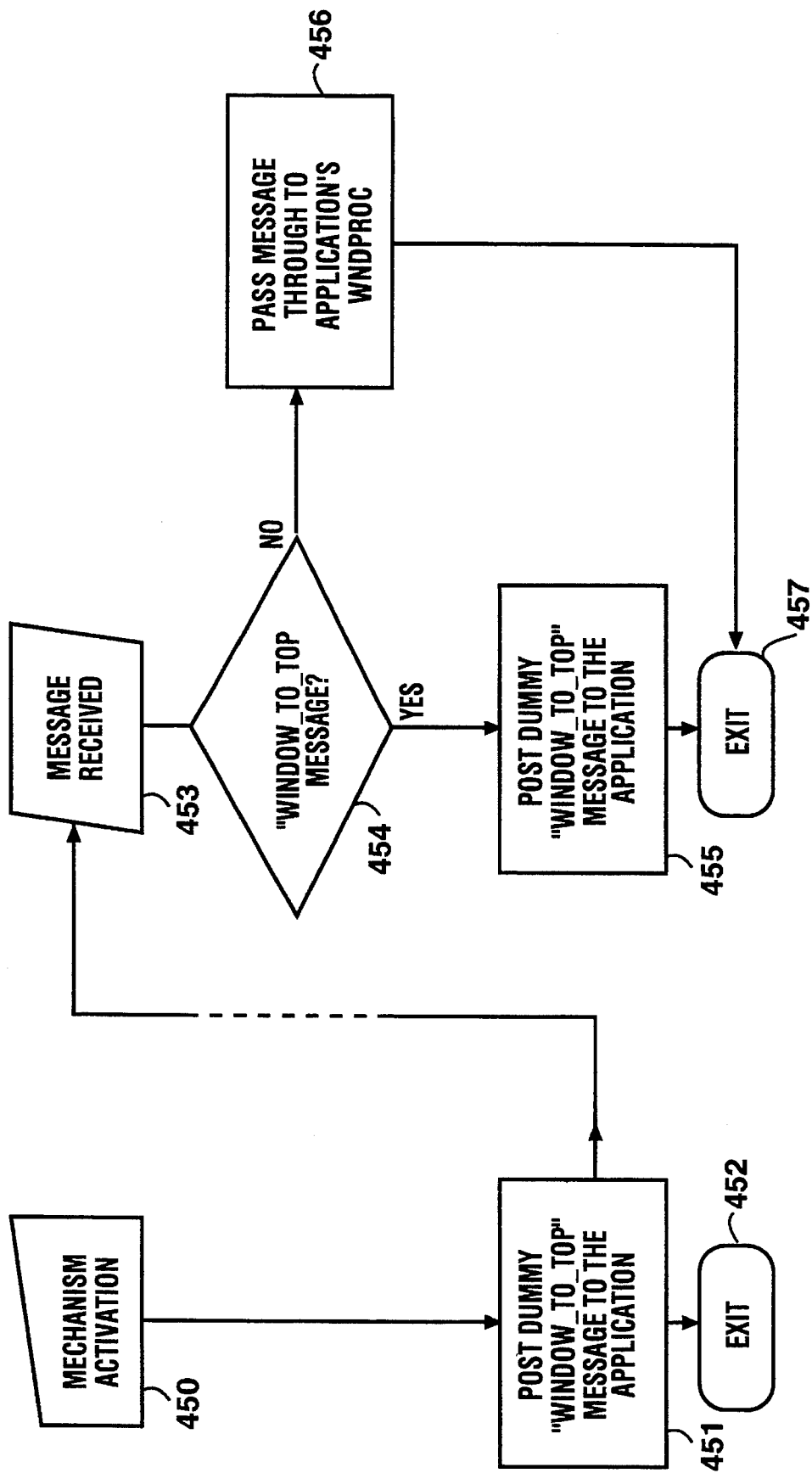
FIG. 16 is a flowchart which illustrates implementation of an MDI child window being brought to the front of a computer screen in accordance with the preferred embodiment of the present invention.

FIG. 16 is a flowchart which illustrates implementation of the preferred embodiment of the present invention. In a step 450, OMF 100 detects the mechanism activation by the user. For example, the mechanism activation is the user clicking on the icon corresponding to the application's MDI child window. In a step 451, OMF 100 sends a "Window_To_Top" message to the application. The "Window_To_Top" message is a dummy message which is recognized only by encapsulation shell 45. In a step 452, the OMF routine exits.

In a step 453, encapsulation shell 45 receives the message. In a step 454, encapsulation shell 45 checks to see if the message is a "Window_To_Top" message. If so, in a step 455, encapsulation shell 455 calls the routine "BringWindowToTop" on the appropriate MDI child window of the application. If in step 454 the message is not a "Window_To_Top" message, in a step 456, encapsulation shell 45 passes the message through to the application's WndProc routine. In a step 457 the message handling routine exits.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a file management system within a computing system, a method comprising the steps of:
   (a) when an operating system for the computing system opens, creates or renames a file, adding a new full path name of the file to a history queue; and,
   (b) when the operating system sends a message to a process of an application program indicating a new window title, performing the following substeps:
   (b.1) searching the history queue for a matching full path name which includes the new window title, and
   (b.2) when the matching full path name which includes the new window title is found within the history queue, displaying on a computer screen an icon which is attached to the matching full name path.

2. A method as in claim 1 wherein in step (a), the history queue stores at most a predetermined number of full path names for files which were most recently opened, created or renamed.

3. A method as in claim 2 wherein in step (a) the predetermined number is eight.

4. A method as in claim 1 wherein step (a) includes intercepting interrupts issued by the operating system to determine when files are being opened, created or renamed.

5. A method as in claim 1 additionally comprising the steps of:
   (c) when the operating system sends a message to the process indicating the process is to be closed, flushing the history queue; and,
   (d) when the operating system sends a message to the process indicating the process is to be destroyed, performing the following substeps:

(d.1) searching the history queue for a full path name which includes an extension for the process, and (d.2) when the history queue has a full path name which includes an extension for the process, displaying on the computer screen an icon which is attached to the matching full name path.

6. A method as in claim 1 wherein step (b) additionally comprises the substep of:

(b.3) in an agent task, focusing on an object represented by the icon.

7. A method as in claim 1 wherein in substep (b.1) the history queue is searched starting with a most recent entry.

8. In a computing system which includes an operating system and a computer screen, a file manager comprising:

a history queue for storing full path names of files;

file history queue updating means for adding a new full path name of a file to a history queue when the operating system opens, creates or renames the file; and, an encapsulation shell which encapsulates a process of an application program, wherein the encapsulation shell, in response to the operating system sending a message to the process indicating a new window title, searches the history queue for a matching full path name which includes the new window title, and when the matching full path name which includes the new window title is found, the encapsulation shell displays on the computer screen an icon which is attached to the matching full name path.

9. A file manager as in claim 8 wherein, the history queue stores at most a predetermined number of full path names for files which were most recently opened, created or renamed.

10. A file manager as in claim 9 wherein the predetermined number is eight.

11. A file manager as in claim 8 wherein file history queue updating means intercepts interrupts issued by the operating system to determine when files are being opened, created or renamed.

12. A file manager as in claim 8 wherein the encapsulation shell includes:

means for flushing the history queue when the operating system sends a message to the process indicating the process is to be closed;

means for searching the history queue for a full path name which includes an extension for the process when the operating system sends a message to the process indicating the process is to be destroyed; and, means for displaying on the computer screen an icon which is attached to the matching full name path when the history queue has a full path name which includes an extension for the process.

13. A file manager as in claim 8 wherein the encapsulation shell searches the history queue starting with a most recent entry.

* * * * *